June 13, 1944.  A. L. PARKER ET AL  2,351,363
COUPLING FOR TUBES
Filed Aug. 20, 1942   2 Sheets-Sheet 1

Inventors
Arthur L. Parker
John N. Wolfram
Wilton Margrave
By Mason, Porter & Diller
Attorneys June 13, 1944.   A. L. PARKER ET AL   2,351,363
COUPLING FOR TUBES
Filed Aug. 20, 1942   2 Sheets-Sheet 2

Inventors
Arthur L. Parker
John N. Wolfram
Wilton Margrave
By Mason, Porter & Diller
Attorneys Patented June 13, 1944

2,351,363

UNITED STATES PATENT OFFICE 2,351,363

COUPLING FOR TUBES

Arthur L. Parker, John N. Wolfram, and Wilton Margrave, Cleveland, Ohio, assignors to The Parker Appliance Company, Cleveland, Ohio, a corporation of Ohio Application August 20, 1942, Serial No. 455,502

6 Claims. (Cl. 285—123)

The invention relates to new and useful improvements in a coupling for tubes and more particularly to a coupling for a tube end of uniform diameter, and a primary object of the invention is to provide a coupling for tubes with a gripping sleeve which surrounds the tube adjacent the end thereof and which coupling is provided with means for contracting the outer end of the sleeve for securing the same to the tube and for contracting the inner end of the sleeve for making sealing contact between the tube and the sleeve.

A further object of the invention is to provide a coupling of the above type with means for limiting the contraction of the sleeve and for causing the sleeve to be positively moved into contact with a camming surface which contracts the inner end of the sleeve and provides a seal between the tube, the sleeve and the body member to which the tube is attached.

A further object of the invention is to provide a coupling of the above type wherein said sleeve is roughened on its inner face so as to firmly grip the tube when the sleeve is contracted.

A still further object of the invention is to provide a coupling of the above type wherein the gripping member is provided with spaced longitudinal slits to facilitate the contracting of the gripping member.

A further object of the invention is to provide a coupling of the above type wherein a ring having a tapered inner face is forced onto the sleeve for contracting the same.

A still further object of the invention is to provide a coupling of the above type wherein the member to which the tube is attached has a tapered surface dimensioned so as to serve as a stop for the initial positioning of the tube and which also serves to establish a seal between the end of the tube and said coupling member when the tube is forced endwise along the tapered surface.

These and other objects will in part be obvious and will in part be hereinafter more fully disclosed.

Figure 1:
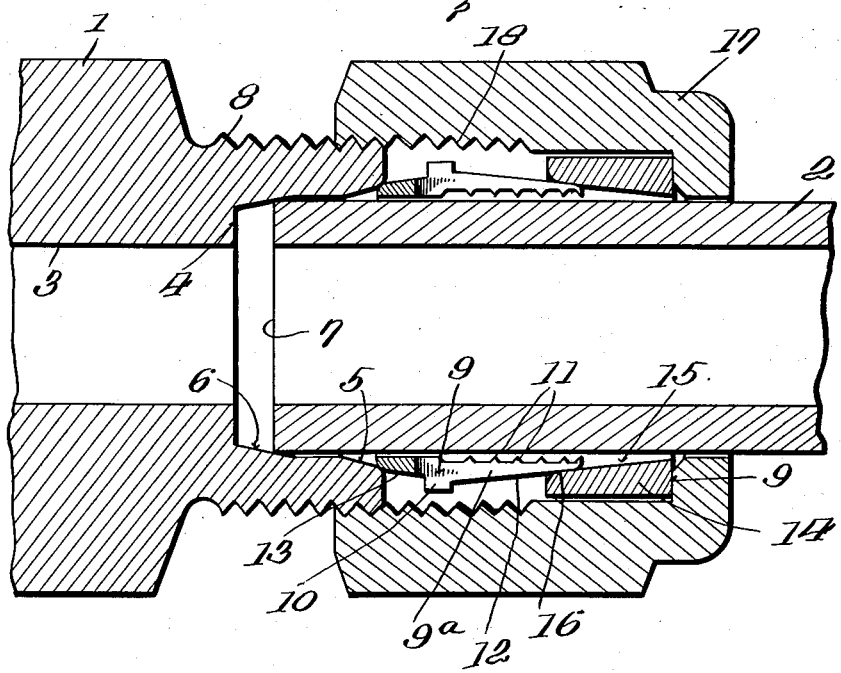
Figure 1 is a longitudinal sectional view through a coupling showing the parts as initially assembled for connecting the tube to the coupling member to which it is to be attached.

The invention has to do with a coupling for a tube end of uniform diameter. The coupling includes a body member to which the tube is to be attached. Said body member has a bore and a camming surface at the entrance of the bore. Said body member may also have a tapered surface serving to initially position the tube and provide a sealing contact with the end of the tube when the coupling is closed. Surrounding the tube is a gripping sleeve which is preferably provided with an outwardly projecting rib intermediate the ends thereof. Said sleeve is also preferably roughened on its inner surface and provided with spaced longitudinal slits extending from the outer end of the sleeve into the body thereof and terminating short of the inner end of the sleeve. In the present embodiment of the invention a ring is housed within a nut which has threaded engagement with the coupling member to which the tube is to be attached and said ring is moved endwise by contact with a shoulder on the nut. The ring and sleeve are preferably tapered so that when the ring is forced onto the sleeve into contact with the rib thereon, said sleeve will be contracted into tight gripping contact with the tube. The ring also serves to positively move said sleeve and tube endwise bringing the inner end of the sleeve into engagement with the camming surface for forming a seal between the sleeve and the body member of the coupling and for also contracting the inner end of the sleeve to cause it to bite into the tube and make tight sealing contact therewith. The ring after engagement with the rib also through the sleeve moves the tube endwise to establish a sealing contact between the end of the tube and the body member of the coupling.

In order that the invention may be clearly understood the preferred form of the invention which has been illustrated will now be described in detail.

The coupling includes a body member 1 to which the tube is to be connected. This tube, as shown in the drawings, is of uniform diameter all the way to the end thereof. The body member has a bore 3 extending therethrough which is of substantially the same diameter as the inner diameter of the tube which is secured thereto. The bore adjacent the outer end is counter-bored so as to provide a camming surface 5, the purpose of which will be hereinafter described and a tapered surface 6 which is so dimensioned that the end 7 of the tube engages said tapered surface adjacent the outer end thereof when initially positioned in the coupling. This tapered surface is of such inclination that when the tube is forced endwise into intimate contact therewith there will be established a tight seal between the end of the tube and the body member of the coupling. In a sense this tapered surface 6 serves as a yieldable stop for the tube end which only yields under pressure to establish the seal as stated. This body member of the coupling is provided with a threaded portion 8.

Surrounding the tube is a gripping sleeve 9 which is dimensioned so as to readily slip on to the tube. Said sleeve is provided with a projecting rib 10 on its outer face which rib is disposed intermediate the ends of the sleeve but preferably nearer the inner end than the outer end. The outer face of the sleeve is tapered as indicated at 12. This taper extends from the inner face of the rib 10 to the outer end of the sleeve. The angle of taper is comparatively slight. For example, in a coupling for tubing of one inch outside diameter and one-fourth inch wall thickness, it has been found desirable to provide an angle of taper of approximately 7°. It is preferably desirable to provide the sleeve with longitudinal slits 9a, although from certain aspects of the invention these slits may be omitted. When the sleeve is provided with slits they extend from the outer end of the sleeve to the inner side of the rib 10. These slits may extend further into the sleeve, but it is preferable that they extend through the rib and terminate short of the inner end of the sleeve so that the inner end of the sleeve when contracted and embedded in the tube by the camming surface 5 will make a tight line seal all the way around the tube. The inner end portion of this sleeve is tapered as indicated at 13 to facilitate the contracting of said portion and the advance end of the sleeve is sharp so as to cut into the tube when contracted.

In the present embodiment of the invention the inner face of the gripping member or sleeve is provided with a roughened surface which may be formed by threading the inner surface of the sleeve, or said surface may be roughened by sand blasting or other means.

A solid ring 14 surrounds the tube and is provided with a tapered inner face 15 the angle of which conforms substantially to the angle of taper of the outer face of the sleeve. The inner end of this ring is rounded off as indicated at 16. The ring is so dimensioned relative to the sleeve that when forced endwise onto the sleeve it will contract the sleeve causing the roughened surface to bite into the tube.

A nut 17 surrounds the ring and sleeve and has a thread 18 for engagement with thread 8 on the body member 1 of the coupling. This nut is recessed so that it houses the ring and sleeve and is provided with a shoulder 19, which engages the ring and forces it endwise onto the sleeve.

Figure 2:
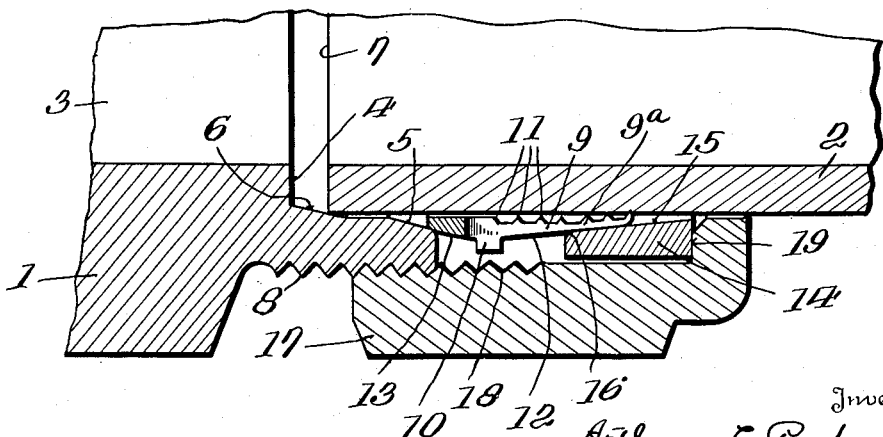
Figure 2 is a view similar to Figure 1 but showing the coupling as partially closed and the outer end of the sleeve or ferrule as contracted and biting into the outer surface of the tube.

In Figure 1 the parts are shown as originally assembled. It will be noted that the end 7 of the tube contacts with the tapered surface 6 which serves as a positioning stop for the tube. When the coupling nut is threaded onto the body member 1 and the coupling closed the ring 5 will be forced onto the sleeve, contracting said sleeve and causing the sleeve to firmly grip and be secured to the tube. In Figure 2 the sleeve has been partially contracted into gripping engagement with the tube by the ring which has been forced onto the sleeve by the threading of the nut onto the body member. The continued turning of the nut will cause the ring to further contract the sleeve until the ring comes into contact with the rib which limits any further movement of the ring relative to the sleeve and therefore the contracting of the sleeve by the ring. Further turning of the nut will cause the sleeve and tube to move endwise as a unit, thus forcing the end of the tube along the tapered surface 6 into sealing engagement therewith. At the same time the pressure exerted against the sleeve by the ring will move the inner end of the sleeve along the camming surface 5 which contracts said inner end and causes it to be embedded in the tube. This not only ensures a very tight seal between the sleeve and tube, but also a very tight seal between the sleeve and the body member of the coupling. This accomplishes a double seal for the tube, that is, a seal directly between the tube and the body member at the inner end of the tube and a seal between the tube, sleeve and body member at the outer end of the body member. It often occurs in certain types of tubes such as welded tubes, that the outer surface is not uniformly smooth. The contracting of the inner end of the sleeve and forcing it to become embedded in the tube will ensure a tight seal even though the outer surface of the tube is not uniformly smooth.

Figure 3:
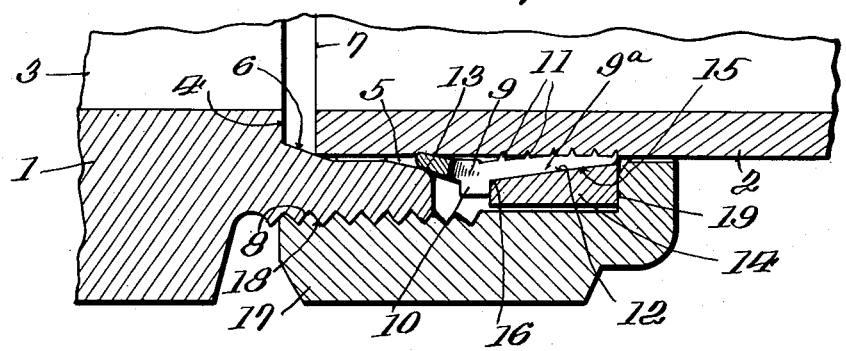
Figure 3 is a view similar to Figure 2 but showing the coupling as normally closed or tight.

In Figure 3 the coupling is shown as normally tight or closed. The tapered ring is in engagement with the rib on the sleeve and the sleeve is fully contracted into gripping engagement with the tube. The camming surface 13 on the body member has caused the inner end of the sleeve to be contracted and embedded in the tube so as to make a tight seal. The rib 10 on the gripping sleeve maintains the tube in tight sealing contact with the body member. If it were not for this rib an outward pull on the tube might cause a further contraction of the sleeve and permit the tube to move outward so as to lose its sealed connection with the body member. However, when the rib is present it abuts against the end of the ring and the ring abuts against the shoulder on the nut and therefore the ring, sleeve, nut and tube cannot move with respect to the body member and a tight seal is maintained at the two points mentioned. When the coupling parts are tightened as shown in Figure 3, no outward movement of the tube is possible except by a shearing and breaking of the grip between the tube and the sleeve.

Figure 4:
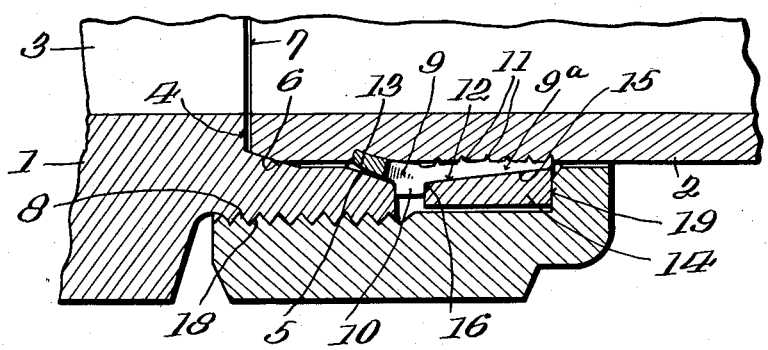
Figure 4 is a view showing an abnormal turning of the nut onto the threaded part and the shoulder on the sleeve or ferrule serving to limit further movement of the parts.
Figure 5:
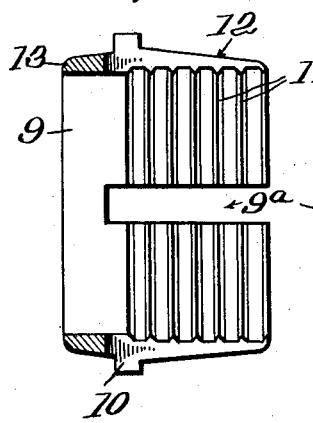
Figure 5 is a longitudinal sectional view through the sleeve.
Figure 6:
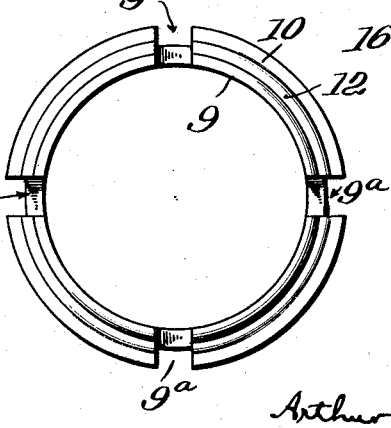
Figure 6 is an end view of the sleeve.
Figure 7:
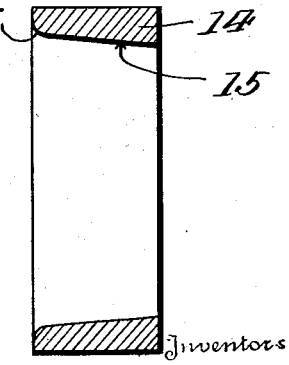
Figure 7 is a sectional view through the ring.

In Figure 4 the nut is shown as turned until the rib 10 contacts with the outer end of the body member. This is an unusual over-tightening of the nut but when it occurs there is a positive limitation against any further turning movement of the nut. When the sleeve is provided with this rib one can determine when the coupling parts are properly tightened. During the assembling the turning torque of the nut is rather low, but as soon as the tapered ring contacts with the rib on the sleeve the turning torque becomes noticeably greater and can be positively felt by the person who assembles the coupling. When the ring contacts with the rib on the sleeve the inner end of the sleeve has already been partially cammed inward into engagement with the tube, but the nut should be given an extra turn or hunch to positively establish the seal between the tube, sleeve and coupling.

While the nut and contracting ring are shown as separate elements, it will be understood that from certain aspects of the invention these parts may be formed as one integral structure.

It is obvious that many changes in the details of construction and the shaping of the parts may be made without departing from the spirit of the invention as set forth in the appended claims.

What is claimed is:

1. A coupling for tubes comprising a body member to which the tube is attached, a clamping means having a threaded connection therewith, a gripping sleeve surrounding the tube adjacent the inner end thereof, said body member having a bore to receive the tube and a camming surface at the entrance of the bore, said clamping means being dimensioned so that when forced endwise onto the outer end of the gripping sleeve said sleeve will be contracted into gripping contact with the tube and secured thereto, said clamping means and sleeve having cooperating parts adapted to contact and prevent further relative movement between the clamping means and the sleeve for limiting the extent of contraction of the outer end of the sleeve by the clamping means and for positively urging the gripping sleeve against the camming surface into sealing contact therewith and for causing the inner end of the sleeve to be contracted into tight sealing engagement with the tube.

2. A coupling for tubes comprising a body member to which the tube is to be attached and a clamping means having a threaded connection therewith, a gripping sleeve surrounding the tube adjacent the inner end thereof, said body member having a bore provided with a tapered surface engaged by the end of the tube and a camming surface at the entrance to the bore, said clamping means being dimensioned so that when forced endwise onto the outer end of the gripping sleeve said sleeve will be contracted into gripping contact with the tube and secured thereto, said clamping means and sleeve having cooperating parts adapted to contact and prevent further relative movement between the clamping means and the sleeve for limiting the extent of contraction of the outer end of the sleeve by the clamping means and for positively urging the gripping sleeve against the camming surface into sealing contact therewith and for causing the inner end of the sleeve to be contracted into tight sealing engagement with the tube and for moving the tube endwise into forced sealing engagement with said tapered surface.

3. A coupling for tubes comprising a body member to which the tube is to be attached and a clamping means having a threaded connection therewith, a gripping sleeve surrounding the tube adjacent the inner end thereof, said body member having a bore to receive the tube and a camming surface at the entrance of the bore, said clamping means having a tapered surface shaped and dimensioned so that when forced endwise onto the outer end of the gripping sleeve said sleeve will be contracted into gripping contact with the tube and secured thereto, said sleeve having a projecting rib with which the clamping means makes contact for preventing further movement between said clamping means and the sleeve for limiting the extent of contraction of the outer end of the sleeve and for positively urging the gripping sleeve against the camming surface into sealing contact therewith and for causing the inner end of the sleeve to be contracted into sealing engagement with the tube.

4. A coupling for tubes comprising a body member to which the tube is attached, a clamping means having a threaded connection therewith, a gripping sleeve surrounding the tube adjacent the inner end thereof and having the inner surface thereof roughened, said body member having a bore to receive the tube and a camming surface at the entrance of the bore, said clamping means having a tapered surface shaped and dimensioned so that when forced endwise onto the outer end of the gripping sleeve said sleeve will be contracted into gripping contact with the tube and secured thereto, said clamping means and sleeve having cooperating parts adapted to contact and prevent further relative movement between said clamping means and said sleeve for limiting the extent of contraction of the outer end of the sleeve by the clamping means and for positively urging the gripping sleeve against the camming surface into sealing contact therewith and for causing the inner end of the sleeve to be contracted into tight sealing engagement with the tube.

5. A coupling for tubes comprising a body member to which the tube is attached, a clamping means having a threaded connection therewith, a gripping sleeve surrounding the tube adjacent the inner end thereof, said body member having a bore to receive the tube and a camming surface at the entrance of the bore, said clamping means including a nut adapted to engage the thread on the body member and a ring housed within said nut, said ring having the inner surface thereof tapered and dimensioned so that when the ring is forced onto the sleeve the sleeve will be contracted into gripping engagement with the tube, said sleeve having a projecting rib thereon with which said ring makes contact for preventing further movement between said clamping means and said sleeve for limiting the extent of contraction of the outer end of the sleeve by the clamping means and for positively urging the gripping sleeve against the camming surface into sealing contact therewith and for causing the inner end of the sleeve to be contracted into tight sealing engagement with the tube.

6. A coupling for tubes comprising a body member to which the tube is to be attached, a gripping sleeve surrounding the tube adjacent the inner end thereof, said sleeve having a projecting rib on its outer face intermediate the ends thereof, said sleeve being tapered from said rib to a relatively thin edge at its outer end and having spaced longitudinal slits extending from said thin edge of the sleeve into the sleeve and through said rib and terminating short of the inner end of the sleeve, said sleeve also having the inner surface thereof roughened, a nut having a threaded engagement with said body member, a ring housed within said nut and adapted to engage a shoulder on said nut, said ring having the inner face thereof tapered to conform substantially to the taper of the sleeve and dimensioned so as to contract the outer end of the sleeve when forced onto the same into contact with the rib, said body member having a bore to receive the end of the tube, said bore having a tapered portion with which the end of the tube makes contact and a camming surface at the entrance of the bore whereby when said nut is threaded onto said body member said ring will first contract the sleeve and secure the same to the tube and then engage the rib and positively move said sleeve into sealing engagement with the camming surface on the body member and cause the inner end of the sleeve to be contracted into tight sealing engagement with the tube and move the end of the tube into forced sealing engagement with the body member.

ARTHUR L. PARKER.
JOHN N. WOLFRAM.
WILTON MARGRAVE.